US008813951B2

(12) United States Patent
Forsthoevel et al.

(10) Patent No.: US 8,813,951 B2
(45) Date of Patent: Aug. 26, 2014

(54) APPARATUS AND METHODS FOR TRANSPORTING MOLDS

(75) Inventors: Jochen Forsthoevel, Regensburg (DE); Frank Winzinger, Regensburg (DE)

(73) Assignee: Krones AG, Neutraubling (DE)

( * ) Notice: Subject to any disclaimer, the term of this patent is extended or adjusted under 35 U.S.C. 154(b) by 357 days.

(21) Appl. No.: 13/214,553

(22) Filed: Aug. 22, 2011

(65) Prior Publication Data
US 2012/0048683 A1 Mar. 1, 2012

(30) Foreign Application Priority Data
Aug. 25, 2010 (DE) .......................... 10 2010 035 496

(51) Int. Cl.
| | |
|---|---|
| *B65G 47/22* | (2006.01) |
| *B29C 49/42* | (2006.01) |
| *B29C 49/36* | (2006.01) |
| *B65G 47/86* | (2006.01) |
| *B29C 49/64* | (2006.01) |
| *B29C 49/12* | (2006.01) |
| *B29C 49/06* | (2006.01) |

(52) U.S. Cl.
CPC ......... *B29C 49/4205* (2013.01); *B29C 49/6409* (2013.01); *B29C 49/12* (2013.01); *B29C 49/06* (2013.01); *B29C 49/36* (2013.01); *B29C 49/4273* (2013.01); *B65G 2201/0235* (2013.01); *B29C 49/42* (2013.01); *B65G 47/847* (2013.01)
USPC ..................... 198/474.1; 198/406; 198/475.1; 198/867.11

(58) Field of Classification Search
USPC .............. 198/406, 411, 474.1, 475.1, 867.11, 198/867.12, 803.14
See application file for complete search history.

(56) References Cited

U.S. PATENT DOCUMENTS

| | | | |
|---|---|---|---|
| 4,212,841 A | 7/1980 | Michel | |
| 4,355,968 A | 10/1982 | Lagoutte et al. | |
| 4,506,779 A * | 3/1985 | Seragnoli | 198/459.1 |
| 5,116,217 A | 5/1992 | Doudement et al. | |
| 5,257,888 A * | 11/1993 | Kronseder | 414/416.06 |
| 5,863,571 A * | 1/1999 | Santais et al. | 425/526 |
| 6,189,701 B1 | 2/2001 | Winter | |
| 6,422,379 B1 * | 7/2002 | Zoppas | 198/803.12 |
| 7,037,099 B2 | 5/2006 | Linke et al. | |

(Continued)

FOREIGN PATENT DOCUMENTS

| | | |
|---|---|---|
| DE | 29708808 | 6/1998 |
| DE | 19751909 | 5/1999 |

(Continued)

OTHER PUBLICATIONS

International Search Report in corresponding German Patent Application No. 10 2010 035 496.1.

*Primary Examiner* — Douglas Hess
(74) *Attorney, Agent, or Firm* — Onello & Mello, LLP (57) ABSTRACT

In a transport device for transporting containers, the transport device includes at least one transport unit movable along a curved track for transporting at least one container in response to a drive unit, the transport unit having a transport component mobile on the track and a receiver device for holding at least one container wherein the receiver device is constructed and arranged to be aligned in response and in relation to at least one movement force imparted upon the receiver device or the container as a result of movement of the transport unit.

15 Claims, 7 Drawing Sheets

(56) References Cited

U.S. PATENT DOCUMENTS

| | | | |
|---|---|---|---|
| 7,275,633 B2* | 10/2007 | Zimmermann | 198/474.1 |
| 7,399,435 B2* | 7/2008 | Dunzinger et al. | 264/40.1 |
| 7,455,514 B2* | 11/2008 | Netsu | 425/534 |
| 7,992,702 B2* | 8/2011 | Furlotti et al. | 198/474.1 |
| 2004/0052892 A1 | 3/2004 | Linke et al. | |

FOREIGN PATENT DOCUMENTS

| | | |
|---|---|---|
| DE | 19821105 | 11/1999 |
| DE | 19909644 | 9/2000 |
| DE | 10033412 | 1/2002 |
| FR | 2917390 | 12/2008 |

* cited by examiner

Prior Art

Prior Art

APPARATUS AND METHODS FOR TRANSPORTING MOLDS

RELATED APPLICATIONS

This application claims priority to German Patent Application No. 10 2010 035 496.1, filed on Aug. 25, 2010, in the German Patent and Trademark Office, the content of which is incorporated herein by reference in its entirety.

TECHNICAL FIELD

The present inventive concepts generally relate to apparatus for transporting molds, systems for transporting molds, and methods for transporting molds.

BACKGROUND

In molding machines, including, for example, those for forming and shaping blow molded components, problems frequently occur when heated preforms (e.g., pre-blown/pre-molded pieces of material) are transferred from the heating device by means of a transfer star or similar rotational transport device, in which the mutual spacing of the preforms is modified, to the also circulating blow wheel. Due to the spacing change the preforms undergo an acceleration which bends the soft heated material because the forces acting on the preforms, in particular centrifugal force, and therefore the preforms are inserted in the blowing mold machine as "bananas". Thus upon longitudinal stretching of a preform by the stretching rods, it is not always guaranteed that the stretching rods will stretch the preform uniformly to its base and so called "off-centers" can occur. These are containers in which the injection point is not arranged in the center of the container, but to one side of the container. This has detrimental effects on the strength of the container base so that, for example, depending on angle position, a container can have different wall thicknesses or can bulge from pressurized contents such as, for example, $CO_2$-containing beverages.

Additionally, in blowing machines, a preform is typically exposed to various forces, including centrifugal forces which can bend or deform the preform. Particularly in rotating blowing machines, the opening where the transfer of performs/containers to and from the blowing machine occurs is normally outward from the axis about which the blowing machine sides are opened while the longitudinal axis of a preform is typically parallel to the rotary axis of the rotating blowing machine, and by rotation of the blowing carousel, centrifugal forces occur which must be countered upon opening and closing the blowing machine and transfer of the preform or container.

U.S. Pat. No. 4,355,968, published on Oct. 26, 1982, German Patent Publication No. DE 29708808 U1, published on Jul. 23, 1998, and U.S. Pat. No. 5,116,217, published on Oct. 26, 1982, each generally propose an apparatus according to which a preform is moved out of one vertically oriented position into a vertical position rotated through 180°. This can be done to reduce the thermal load on the thread on a preform and thus avoid undesirable heating of the threaded section of a preform.

French Patent Publication No. FR 2917290, published on Dec. 19, 2008, discloses a device according to which preforms fitted with a holding device can be rotated in a defined manner.

SUMMARY

An aspect of an inventive concept includes a transport device which is suitable for transporting heated preforms at high speed and blowing these into containers without the preforms being deformed by centrifugal force. In an embodiment, the containers are bottles.

In an embodiment, a transport device for transporting preforms or containers made from the preforms, in connection with the processing of the preforms or containers by a blow-moulding machine, the preforms or containers include a first state and a second state to which they are transformed. In an embodiment, a portion of a preform is in the first state when the portion is in a deformable state (heated and/or very thin-walled). In an embodiment, the deformable portion is transverse to the longitudinal axis of the preform.In an embodiment, a portion of a preform is in the second state when that portion of the preform is not heated or is only partly heated. In an embodiment, that portion of the preform which is in the second state is in a non-deformable state. It shall be understood that the terms "preform" and "container" may be used interchangeably as they may represent either different or the same states of the same article of material. In an embodiment, a conveyor device proximal to the blowing machine includes at least one transport unit for transporting at least one preform, for at least part of the time, on a track, such as, for example, a track which is all or partially curved, The transport unit is connected at least indirectly with a drive unit, and has a transport component mobile on a curved portion of the track. In an embodiment, a mobile element of the transport device is preferably mobile on a defined portion of the track, and a receiver device is mobile in relation this transport component. In an embodiment, the transport unit can be formed as one or more parts of a blow molding machine and/or is a device which supports the preform in the area of the carrier ring, to hold the at least one container or preform.

The term "movement force" can mean a centrifugal force and/or an acceleration force and/or a resulting force of at least one of these two with gravity, but shall not be interpreted as gravity alone.

According to an embodiment of inventive concepts, the receiver device is constructed and arranged for aligning the preform with "movement force" associated with the transport of the preform. In an embodiment, the receiver device is constructed and arranged to align the preform with "movement force" for at least part of the time in which a "movement force" is applied to the preform. In an embodiment, the alignment can be applied at least indirectly and, in an embodiment, is applied directly, with respect to at least one "movement force." In an embodiment, the at least one "movement force" includes a force caused by the movement of the receiver device in response to the movement of the transport device. In an embodiment, the at least one "movement force" includes a force caused by movement of the preform in response to the movement of the transport or receiver device. It is conceivable here that for example a swivelling of the preform occurs in relation to the perpendicular direction.

In an aspect of inventive concepts, the transport device includes a container processing machine of the rotating type which is designed to transport containers and/or bottles, or the transport device including a transport mechanism which transports the containers or their preforms at an angle relative to the longitudinal axis of the containers or preforms and/or tilts the longitudinal axis of the containers or preforms by an angle in relation to the rotary axis of the transporting device. In an embodiment, the transport mechanism a reduces or counteracts the momentum of the mass forces that would otherwise affect the container or preform during transport. In an embodiment, the momentum of mass forces that are reduced or counteracted are directed to the handling point of the container or preform. In an embodiment, the transport device is integrated with at least one preform treatment device.

The term "alignment" can be interpreted as the position of a preform longitudinal axis with respect to at least one movement force acting on the preform during transport. In an embodiment, the longitudinal axis of the preform is aligned at an offset angle of less than 85° with respect to the direction of centrifugal force. In a further embodiment, the axis is aligned at an offset angle between 35° and 70°. In a further embodiment, the axis is aligned at an offset angle of less than 20°.

In an embodiment, the receiver device and/or the preform is arranged in a fixed or variable orientation in relation to the transport component.

This can be advantageous as an alignment of the preforms can be adapted to the movement conditions. Thus a deformation of the preform or preforms can be prevented or reduced. Thus, for example, a deflection of force, active at least part of the time and/or passive, that acts on the preform during transport can be provided. In an embodiment, a preform can be positionally aligned during delivery of a preform to a mold carrier. In an embodiment, the mold carrier is a blow mold carrier which has a transport opening that opens like a book, or a blow mold carrier which has a transport opening with a transport delivery axis that lies at a specific angle (e.g., in relation to the radial axis of a transport track. In an embodiment, the specific angle in relation to the radial axis can be about 45°. At such an angle, for example, a blow molding machine transport wheel can assume a general form of an "inverted parasol". In various embodiments, a blow mold carrier opening mechanism with the described alignment can be provided. In an embodiment, a portion (e.g., 50°) of the blow mold carrier can be fixed and the remaining portion of the blow mold carrier can be mobile. In an embodiment, a blow mold carrier opening is arranged for linear movement.

In an embodiment, the transport device transports the container or its preform such that the longitudinal axis of the preform is inclined or offset with respect to vertical at least part of the time. "Inclined" can be interpreted to mean an angle which lies between a vertical alignment and a horizontal alignment. In an embodiment, the container or preform is inclined at an angle of between 10° and 80° from the vertical direction.

In an embodiment, the preform comprises plastic. In an embodiment, the preform comprises glass.

In an embodiment of the inventive concepts, the movement force comprises the centrifugal force which results from transport movement on a curved track. In an embodiment, the movement force comprises an acceleration force which occurs from a change in transport speed. In an embodiment, the movement force occurs from a change in orientation or inclination in relation to the movement direction. In an embodiment, the movement force comprises or constitutes inertia and/or the weight of the preform, or is the result of the vectorial sum of these forces. This embodiment is advantageous, for example, as the alignment can be adapted to the maximum possible number of movement sequences and movement conditions.

In an embodiment of inventive concepts, the receiver device can be swivelled about at least one first axis. In an embodiment, the receiver device can be swivelled through an angle of 30° to 120° and, in an embodiment, swivelled at right angles about an axis that is substantially perpendicular in relation to a centrifugal force. Advantageously, a swivel axis can also be vertical to a direction of weight force. In an embodiment, the swivel axis is parallel to a geometric tangent of the direction of movement preforms on a movement track.

Various embodiment are advantageous as there is a degree of freedom which can be utilised to reduce load e.g. bending and/or torsion load.

In an embodiment of inventive concepts, the receiver device can be swivelled about a second axis. In an embodiment, the first axis and the second axis are in the same plane. In an embodiment, the first and second axis extend in different planes. In an embodiment, the second axis is inclined with respect to the first axis.

Various embodiments are advantageous, so that in addition to the first degree of freedom, at least part of the time there is a second degree of freedom for movement of the receiver device or preform.

In an embodiment of the inventive concepts, the preform can be acted upon merely by a force in its body's longitudinal direction, at least part of the time, during transport.

Various embodiments are advantageous as improved transport speeds can be attained since the preform is loaded in an optimal load-bearing way. It is possible that the preform is aligned such that its longitudinal direction is aligned in the direction which corresponds to the direction of the force acting on it and resulting from centrifugal force and weight. To help secure transport of the preform in an embodiment and to absorb the acceleration forces, the preform is supported by the receiver device by form fitting elements. In an embodiment, the form fitting elements support at least one and, in an embodiment, in both directions of its longitudinal axis. In an embodiment, support can be provided on a peripherally annular protrusion (e.g., a carrier ring) arranged on the preform. In an embodiment, the receiver device can clamp the preform between the surface of the underside of the carrier ring and its top or, alternatively, on the top edge of a mouth piece arranged above the carrier ring.

In an embodiment, the acceleration force and the centrifugal force can be compensated by the alignment wherein the receiver device or preform is mounted to be swivelable about two axes. In an embodiment, the receiver device includes two spatially separate, single axis swivel bearings or a ball joint. In such an embodiment, the preform is swivelled both through a certain angle in a plane spanned by the vector of centrifugal force and that of weight (compensation for centrifugal force) and through a certain angle in a plane spanned by the tangent to the curved track and weight (acceleration in the transport direction, in particular in the rotation direction of the rotating transport star). The acceleration force can be caused by a change in the spacing of the preforms with respect to each other along a transport track. For example, delivery from a heating device to a blow wheel can cause of such acceleration as the blowing moulds normally have a greater mutual spacing than the holders for the individual preforms in the heating device. Thus, a resulting change (and acceleration) can occur in the (rotational) track speed.

In an embodiment, a preform is mountable so as to be rotatable about its longitudinal axis. Such an embodiment can be particularly advantageous for asymmetric preforms which, for example, may be fitted with a handle. If, for example, such a handle and the longitudinal axis of the preform longitudinal axis span a plane, in an embodiment, the preform can be actively aligned in the plane spanned by the vector of centrifugal force and that of weight before application of a centrifugal force in this plane. In another embodiment, the preform can self-align even shortly after the effect of this force.

Many variants of centrifugal force can be caused by various positions of various cavities within a blow molding machine based on the arrangement of parts of the blow molding machine. Both for the bending forces occurring on the preform and for the forces during the opening and closing of the blow mold, each deviation of the movement axes or the preform center axis from the rotary axis of the transport device such as, for example, a blow wheel or a transport star, are reduced or counteracted in an embodiment of the inventive concepts.

In an embodiment, the device components holding the preform are arranged to be substantially neutral in relation to centrifugal force. In an embodiment, a preform coming from a heating module is delivered to a transport device having a rotary axis that is arranged perpendicular to centrifugal forces caused by rotational transport. In an embodiment, the rotary axis of the blow wheel and the rotary axis of the transport device can be oriented perpendicular to the preform's longitudinal axis.

In an embodiment, of inventive concepts, the alignment of the receiver device and/or container/preform can be performed automatically. In an embodiment, the receiver device or the preform in the receiver device is mounted such that the receiver device and/or the preform are aligned in a state of optimum or minimum load in the range of the given degrees of freedom.

Such an embodiment can advantageous as the receiver device can thus be adapted to the respective movement conditions by very simple means and at low cost.

In an embodiment of inventive concepts, the alignment of the receiver device and/or the container/preform can be performed by means of an alignment device. In an embodiment, a control device (or control unit) and/or sensor device is provided which can detect and/or evaluate speed, acceleration, forces, bending of the preform and/or the like. In an embodiment, a force sensor can be arranged directly on the receiver device. In an embodiment, bending of a preform is preferably detected and evaluated by a camera. In embodiments, the camera can be arranged stationary and can also be arranged non-stationary. In embodiments, the sensors or cameras can either be stationary or mounted on the receiver device to move with it.

In an embodiment including an alignment device, alignment movements can be prespecified, whereby the movement or alignment of the preform or the receiver device can be performed and/or controlled as a function of data detected and/or pre-specified settings. In an embodiment, a reaction is possible to different production speeds of the machine.

In an embodiment of inventive concepts, the alignment device comprises at least one motor which is contact with the transport component and/or receiver device. In an embodiment, the motor is a servo motor.

In an embodiment, the motor can be an electric motor, a pneumatic motor, a hydraulic motor, a linear motor and/or other motor, which can move the alignment device and/or container in relation to the transport components.

In an embodiment, the motor can implement very rapid movement changes. In an embodiment, the alignment device can very quickly be adapted to modified movement conditions. In an embodiment, the motors or motor can be controlled as required for any tracks and can be operated self-learning via a control device which can include sensors.

In an embodiment of inventive concepts, the alignment device is formed at least in sections as a control curve.

In an embodiment, a defined movement characteristic of the alignment device can be prespecified. Such an embodiment can be less complex than those with the use of motors.

In an embodiment, the use of springs can be used to pretension the receiver element against a defined stop in combination with one of the said alignment devices.

In an embodiment, the preform or the container is swivelled out and/or back, i.e. swivelled for example out of a substantially vertical position into a inclined position or vice versa, before delivery to the further device, e.g. a blow wheel, by means of an active control unit. These movements of the receiver device and/or the preform can, for example, be carried out by means of a deflection device such as, for example, a control curve and/or a servo motor.

In a further embodiment, the alignment of the receiver device can be carried out automatically in sections and/or guided in sections.

In an embodiment, by means of guiding the receiver device, extremely precise movements can be performed or alignments set, while in further sections of the transport device for example very few components need to be provided as it is conceivable that in these areas at least in sections there is no control curve.

In an embodiment, a heating device for heating the plastic preforms is provided to apply heat prior to transport in the transport device. This heating device can, for example, be an infrared oven or even a microwave oven through which the plastic preforms are transported.

In an embodiment, a heating device can also be considered. The preforms here are frequently pushed onto heating mandrels which transport the preforms through the oven as an inner gripper as a receiver unit, and are transported past heating devices or optionally with them into heating cavities. In these ovens the preforms are at least part of the time also transported on curved tracks where centrifugal forces can also occur. Here it is conceivable also to provide, for at least part of the time, an alignment of the heating mandrel in the manner described above. Also the frequent auto-rotation of the preform during the heating process should be considered. In the case of defective or asymmetric preforms, by auto-rotation or poor attachment to the heating mandrel, tumbling can occur through to loss of the preform. This can be countered for example by controlled rotation and the control device already described. Thus the angular speed of the auto-rotation can be reduced for example on a recorded error (tumbling).

In an embodiment, a transport is provided of preforms or containers on shuttles through a filling plant and, for example, through the oven up to blow moulding in a blow moulding machine. The preforms are placed on a receiver unit arranged on the shuttle, in particular mandrels. The shuttles or slides moved on a track or guide are here formed in particular as rotors and the tracks as stators of a linear motor. Also however other mechanical drives are conceivable. Here for example the forces occurring could be reduced by offsetting the receiver unit on the shuttle or by tilting the tracks or guides like figure-of-eight track. Also as described above in general, the acceleration forces of the shuttles themselves can be reduced.

In an aspect of inventive concepts, a method of transporting containers, in particular performs, is provided. The method comprises the steps of thermal conditioning of a preform in a heating device, delivery of the preform from the heating device to a transport unit of a further transport device, movement of a transport unit to transport at least one container or preform on at least one track, for example, a track formed at least in sections as a curved track, which transport unit is connected at least indirectly with a drive unit and comprises a transport component mobile on the track and a receiver device mobile in relation to this transport component to receive at least one preform, and alignment of the preform, for example, in relation to the curved track, with the receiver device wherein the receiver device at least indirectly is aligned as a function of at least one force acting on movement of the transport unit on the receiver device and/or the preform and is preferably moved, and can comprise the step of expanding the preform (10) against the inner wall of a blow mould.

In an embodiment, delivery to the blow mould can take place in particular by a gripper arm, in particular actively controlled, or a further gripper arm so as to prevent collision e.g. of the primary delivery mechanism of the transport device which is formed e.g. as a transfer star with the stretch rod mechanism (e.g., a simple gripper mechanism, rhomboid gear).

Variants are conceivable in relation to the position of delivery e.g. both an arrangement of the delivery outside and inside the blow wheel is conceivable. This could for example require a larger blow wheel whereby it is conceivable that in the case of such a blow wheel, fewer components need be provided outside the blow wheel.

In an embodiment, the blowing station and the transport star clamp (or receiver device) are at a particular angle which results from centrifugal force at common speeds (peripheral speed). For a blowing station these can be, for example, 2000 revolutions per hour but could be from 1000 to 3000 revolutions per hour. For the transport star clamps the peripheral speed or transport speed can amount to three times this.

In an embodiment, further transporting devices can transport the containers in a manner adapted to the movement conditions or loads. It is therefore also conceivable that rinsing, filling or closing can take place "centrifugal force-neutral". In an embodiment, "centrifugal force-neutral" handling after filling and closing the bottle includes loading delicate drinks with less oxygen when filling, with less head room volume and higher fill levels.

In an embodiment, shortly before delivery of the preforms to the receiver unit (blowing station), for example, the "centrifugal force-neutral" alignment can be completely or partly removed.

In an aspect of inventive concepts, a transport device for transporting containers is provided, the transport device including at least one transport unit movable along a curved track for transporting at least one container in response to a drive unit, the transport unit having a transport component mobile on the track and a receiver device for holding at least one container wherein the receiver device is constructed and arranged to be aligned in response and in relation to at least one movement force imparted upon the receiver device or the container as a result of movement of the transport unit. In an embodiment, the movement force is at least one of a centrifugal force and an acceleration force.

In an embodiment, the receiver device can be swivelled about at least one first axis.

In an embodiment, the receiver device can be swivelled about a second axis.

In an embodiment, the receiving unit is constructed and arranged so that the alignment of the receiving unit substantially deflects the at least one movement force to a movement force directed along the longitudinal axis of the container.

In an embodiment, the receiver device is constructed and arranged to automatically align the container.

In an embodiment, the receiver device is constructed and arranged to be aligned by an alignment device In an embodiment, the alignment device comprises at least one servo motor which is in contact with both the transport component and the receiver device.

In an embodiment, the alignment device comprises sections that represent a control curve.

In an embodiment, the receiver device is constructed and arranged to be aligned automatically in sections and guided in sections.

In an embodiment, the transport device is a transport star.

In an embodiment, the transport device is a blow wheel.

In an embodiment, transport device is a shuttle system.

In an embodiment, the receiver device is constructed and arranged to align the body of the container while the container is deformable in a direction transverse to its longitudinal axis.

In an aspect of inventive concepts, a method for transporting containers is provided which includes moving a transport unit for transporting at least one container along at least one curved track, wherein the transport unit moves in response to a drive unit, and wherein the transport unit has a transport component mobile on the track. The method further includes holding the at least one container in a receiving unit and aligning the receiving unit in response at least one movement force imparted on the container or receiving unit, wherein the at least one movement force imparted on the container or receiving unit results from movement of the transport unit.

Other advantages, objectives and properties of the present invention are explained below with reference to the drawing and description, where the drawing shows example transport devices for the transport of containers. Components of the transport devices which in the figures at least substantially correlate in relation to function may be given the same reference numerals, wherein the components may not be referenced or explained in all figures.

Figure 1:
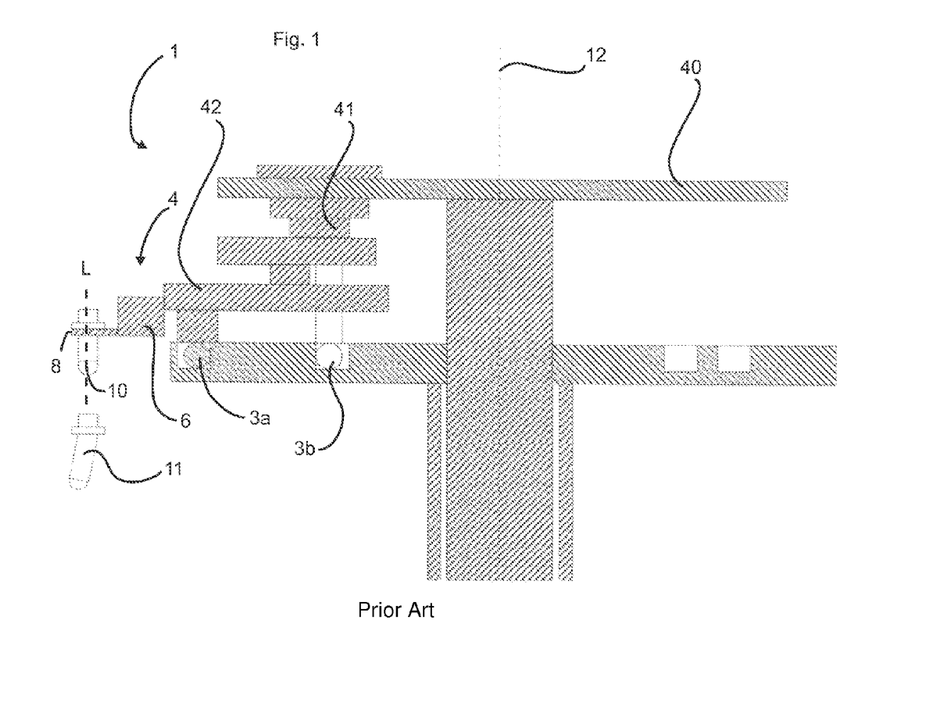
FIG. 1 shows a transport device according to the prior art.

FIG. 1 shows a transport device 1 according to the prior art. This transport device 1 has a transport unit 4 comprising a transport component 6 and an associated receiver device 8. The receiver device 8 serves to hold a preform 10 and is in particular a clamp or a mandrel. On movement of the device 1 i.e. in particular on a rotation about rotation axis 12 and hence on a movement, in particular sliding, of the device 1 on the curves for the pitch distortion 3a, 3b, a load occurs on the heated preform 10. As a function of the rotary speed of the device 1, forces act on the preform 10 whereby this deforms. A deformed or defective preform 10 is for example identified by reference numeral 11. The transport path described by the preforms 10 is substantially determined by the curved tracks 3a, 3b, wherein a curve follower of a slide of an extendable linear bearing 42 runs along track 3a and curve follower arranged with a lever to a rotary axis 43 of transport unit 4 runs along track 3b. Reference numeral 42 refers to a rotatable roller bearing. This in turn is mounted on a bearing plate 40 rotatable about an axis 12. The part of the transport unit 4 swivelable about the rotary axis 43 comprises for example the linear bearing 42, the transport component 6 and the receiver unit 8. The combined rotation and extension movement determines the transport path of the preforms 10 and is therefore not precisely circular. However other function methods are conceivable for the transport device in which only one or no swivel movement is provided, or in which the curves are replaced by servo drives or linear drives for performance of swivel or linear movements of the individual components.

These function methods can be transferred in a similar manner to the following figures.

Figure 2:
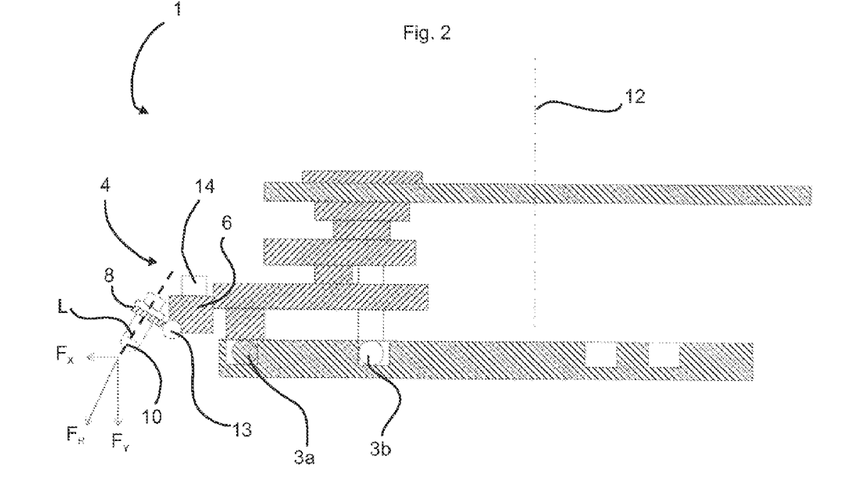
FIG. 2 shows an embodiment of a transport device including curves for pitch distortion according to present inventive concepts.

FIG. 2 shows a transport device 1 according to inventive concepts which also has curves for pitch distortion 3a, 3b. This device 1 comprises furthermore at least one transport unit 4 and particularly preferably a multiplicity of transport units 4. The transport unit 4 here includes a transport component 6 and a receiver device 8 mobile in relation to the transport component 6. By means of the receiver device 8 for example a container, in particular a preform 10, can be picked up from the transport device 1. The receiver device 8 can be coupled with the preform 10 by friction and/or form fit. The receiver device can for example be a gripper clamp which grips the containers below or preferably above their carrier ring. This gripper clamp can be controlled or passive (for example pretensioned by springs).

The transport device 1 also moves, for example, about the rotation axis 12. Depending on the movement of the transport device 1, in particular the speed of transport device 1, the preform 10 is aligned in relation to the other device components, for example, in relation to transport component 6. This alignment takes place, for example, by a rotation or swivel movement of the receiver device 8 about the first axis 13 which is, for example, arranged between the transport component 6 and the receiver device 8.

In the transport component 6 can be arranged swivel bearings for the opening and closing movement of the gripper clamp.

Such an alignment can be performed, for example, by means of a drive 14, which is in particular, for example, a servo drive. It is here conceivable that the drive, by means of a control device as a function of forces acting on the preform 10 and/or a movement characteristic of the transport device 1, causes the alignment of the receiver device 8 and/or the preform 10. The drive 14 can drive the movement of the receiver device 8 either directly or by means of a gear. It is evident from this depiction that forces act on the preform 10 in the X and Y direction. Particularly, for example, the receiver device 8 and/or preform 10 are aligned such that the forces ($F_x$, $F_y$) in the X and Y direction are divided such that the resulting force component ($F_r$) extends in the base body longitudinal direction of the preform 10.

It is conceivable here that not only force components in the X and Y direction but also in the X, Y and Z direction are taken into account (caused for example by acceleration or deceleration of the blow wheel and the consequent deceleration of the transport star) and an alignment of the preform 10 and/or receiver device 8 takes place such that the resultant is also oriented in the base body longitudinal direction of the preform 10. The longitudinal direction of the plastic preform is identified by reference numeral L. The preform 10 in the alignment shown in FIG. 2 experiences a tension load in its lower closed section and a compressive load in its upper section i.e. in the area of the carrier ring and above the carrier ring. The area above the carrier ring is not however usually heated and therefore does not deform. The Z direction is here, for example, substantially tangential to the transport direction and goes into the drawing plane.

Figure 3:
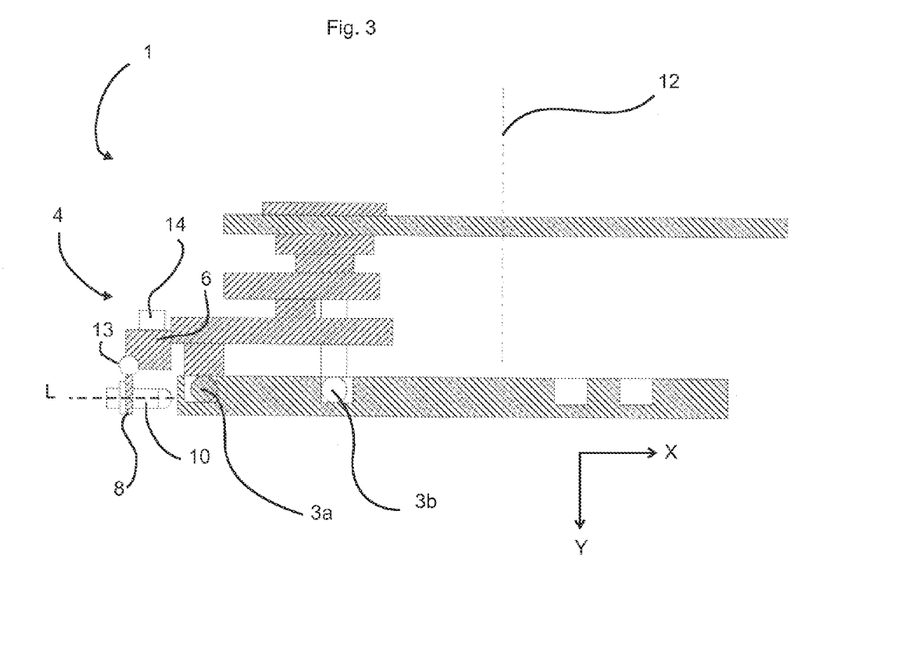
FIG. 3 shows the transport device of FIG. 2 in another alignment state.

FIG. 3 shows the embodiment shown in FIG. 2 in a further alignment. According to this depiction, on a rotation of the conveyor device 1 about rotation axis 12, a tension load is exerted on the upper section of the preform 10 i.e. the opening area and a compression load on the lower section of the preform 10 i.e. the closed section. The receiver device 8 in this configuration is, for example, coupled with the preform 10 such that a shift or relative movement of the preform 10 in relation to the receiver device 8 in the X direction is not possible. In other words the closed side of the preform 10 runs radially more inwards than the open side.

Figure 4:
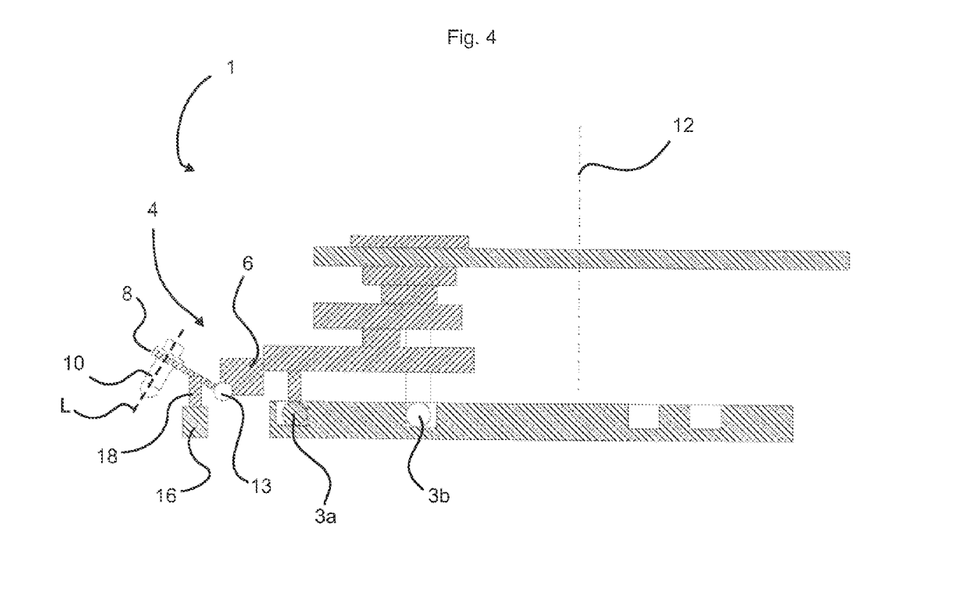
FIG. 4 shows a transport device according to an embodiment of present inventive concepts.

FIG. 4 shows a further embodiment of the present invention. According to this embodiment the transport device 1 has a transport unit 4 which comprises a transport component 6 and a receiver device 8 mobile in relation to this transport component 6. The receiver device 8 however cooperates with a control curve 16, for example via a cam 18. It is conceivable here that the cam 18 is arranged on the control curve 16 or on the receiver device 8 or in the area of the receiver device 8. The control curve 16 is, for example, configured defined in relation to height and/or point of contact with the receiver device 8. The configuration of the control curve 16, for example, takes place as a function of a movement characteristic of the transport device 1. This cooperation for example of the receiver device 8, control curve 16 and/or cam 18 can thus cause a deflection, as a function of the movement characteristic of the transport device 1, of the preform 10 and/or receiver unit 8 about the first axis 13 such that the preform 10 is loaded as far as possible only in its base body longitudinal direction by a force, in particular by centrifugal force.

Figure 5:
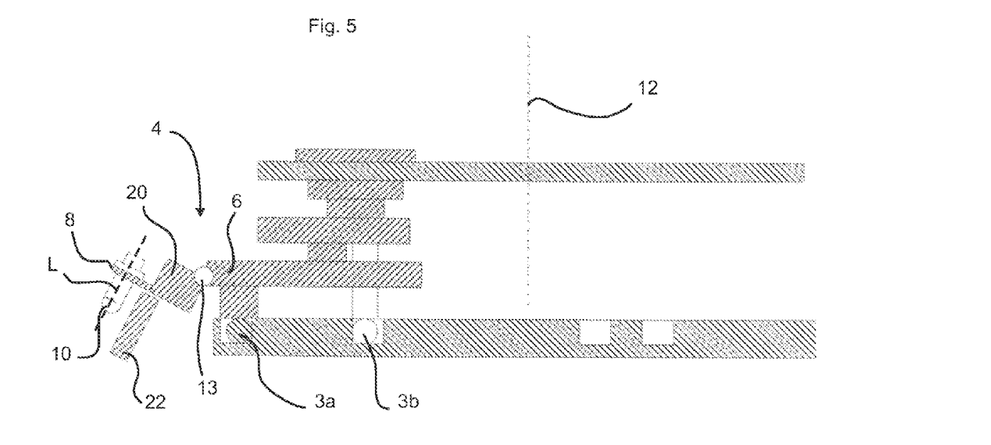
FIG. 5 shows a transport device according to an embodiment of present inventive concepts.

FIG. 5 shows a further embodiment according to inventive concepts of the present invention. The receiver device 8 can, at least part of the time or permanently, be fitted with a fixed additional weight 20 and/or an additional weight 22 that can be coupled to the receiver device 8. It is conceivable that in individual sections of the transport path, one or more additional weights 20, 22 are or can be coupled with the receiver device 8. An alignment of the receiver device 8 and/or the preform 10 takes place e.g. in sections or completely along the transport route by means of weight i.e. the receiver device 8, preform 10 and any additional weights 20, 22 are rotated about the first axis 13 under centrifugal force. According to this embodiment it is also preferred that the load on the preform 10 is applied only in its base body longitudinal direction. Furthermore it may be possible that at least one of the additional weights 20, 22 can be moved along the receiver device 8 or fixed at various areas of the receiver device 8, for example to change the lever ratios. The additional weights shown can therefore cause the desired deflection of the plastic preforms.

It is furthermore conceivable that the embodiment shown in FIG. 5 comprises, in sections or completely, a control curve 16 for alignment of the receiver device 8 and/or the preform 10.

The position of the swivel axis 13 described can be selected arbitrarily in the various embodiments. Thus in FIGS. 2 to 4, any position between linear bearing 42 and receiver device 8 is conceivable, in particular between linear bearing 42 and transport component 6. Also it would be conceivable to omit the transport component 6 completely and arrange the receiver device 8 pivoting on the linear bearing 42. The transport component 6 in the widest sense is merely a block on which the receiver device 8 is arranged.

Figure 6:
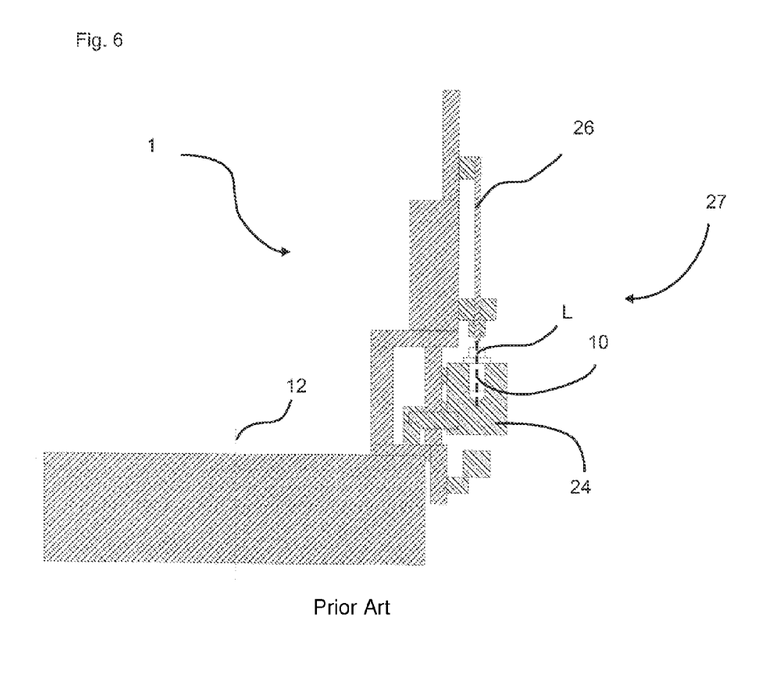
FIG. 6 shows a blowing machine according to the prior art.

FIG. 6 shows an embodiment of a transport device 1 according to the prior art. This transport device 1 comprises a blow mould 24 and a stretch rod 26 and therefore forms a blow station 27. It is clear from this embodiment that the preform 10 is mobile about the rotation axis 12 within the blow mould 24 and the stretch rod 26. On such a movement of the blow mould 24 and hence the preform 10, it is also conceivable that damage can result to the preform 10 and/or the container 10 produced because of forces acting on the preform 10 or associated container during movement of the device 1.

Figure 7:
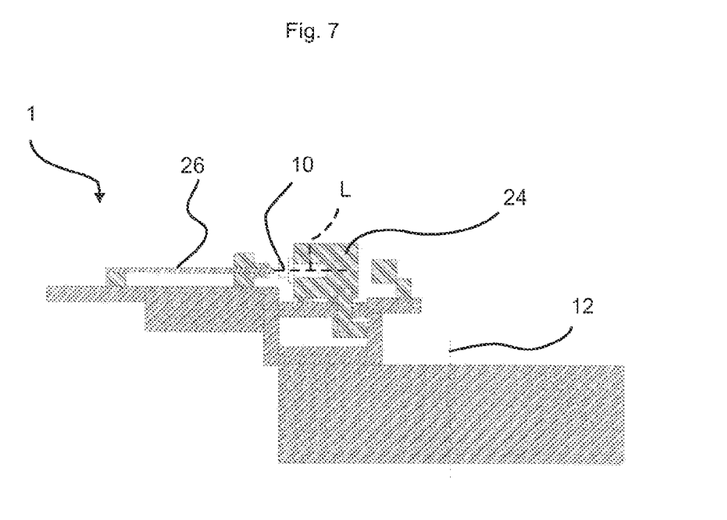
FIG. 7 shows an embodiment of present inventive concepts including a blowing machine.

In FIG. 7, a transport device 1 in particular a blow device or a blow machine is structured such that the preform 10, blow mould 24 and stretch rod 26 extend in a, for example, horizontal plane and thus, for example, substantially perpendicular to the axis of rotation.

Figure 8:
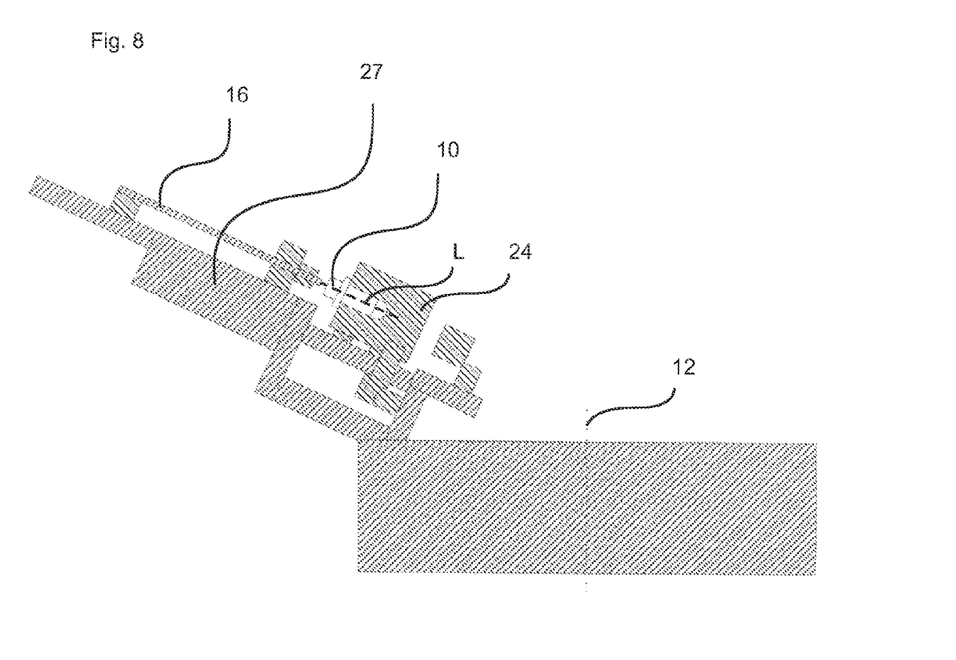
FIG. 8 shows an embodiment of inventive concepts including a blowing machine.

FIG. 8 shows a further embodiment of the present transport device 1, in particular a blow device 27. In this embodiment the blow mould 24, stretch rod 26 and preform 10 are arranged in a plane angled to the horizontal or perpendicular. For example, the plane in which the blow mould 24, stretch rod 26 and preform 10 are arranged is inclined at an angle of 1° to 89° and particular, for example, at an angle of 20° to 70° in relation to the horizontal plane or rotation axis 12. For example, the entire blow station 27 consisting of a blow mould 24 and/or stretch rod 26 is aligned at a fixed angle in relation to the horizontal. It is however also conceivable that the blow station or blow machine unit 27 can be aligned variably or swivelably in relation to the horizontal or vertical (depending or orientation of transport device 1) by means of alignment devices according to FIGS. 2 to 5.

Figure 9:
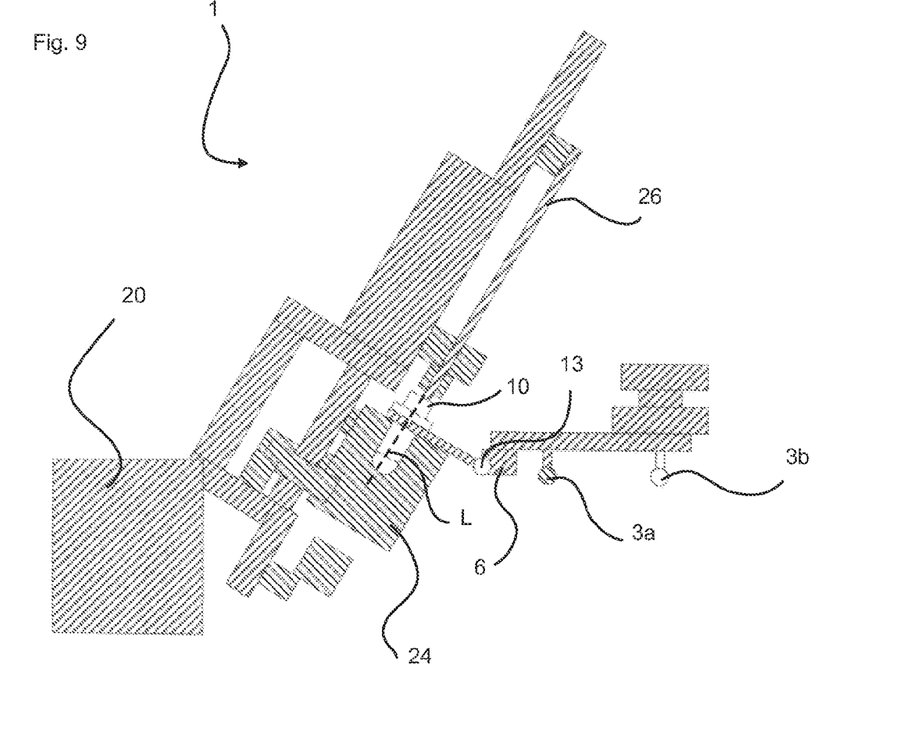
FIG. 9 shows a transport device according to an embodiment of present inventive concepts.

FIG. 9 shows a further embodiment of the transport device 1 according to inventive concepts. This shows the delivery of a preform from a transport device 1 to a further transport device 30, here formed as a blow wheel. The further transport device 30 here comprises the blow station 27 consisting of at least one blow mould 24 and/or at least one stretch rod 26 arranged on the rotating blow wheel 30. The blow station 27 and hence also the longitudinal axis of the preform 10 enclose an angle of around 30° to 40° with the perpendicular, here formed also as the rotary axis of transport devices 30 and 1. The blow station 27 is, for example, arranged immobile on the blow wheel 30 but could also be swivelable. The swivel movement of the blow station 27 or as shown here the receiver unit 8 can for example take place in sections actively and/or passively. For example, a passive deflection or alignment takes place of the blow station 27 and/or the receiver unit 8 in relation to the transport component 6, prespecified by a servo motor and/or a control curve. It is however also conceivable that a deflection of the blow station 27 and/or receiver unit 8 takes place solely as a function of a force acting on the blow station 27 and/or receiver unit 8, in particular centrifugal force. A combination of active and passive alignment processes is therefore also conceivable.

Figure 10:
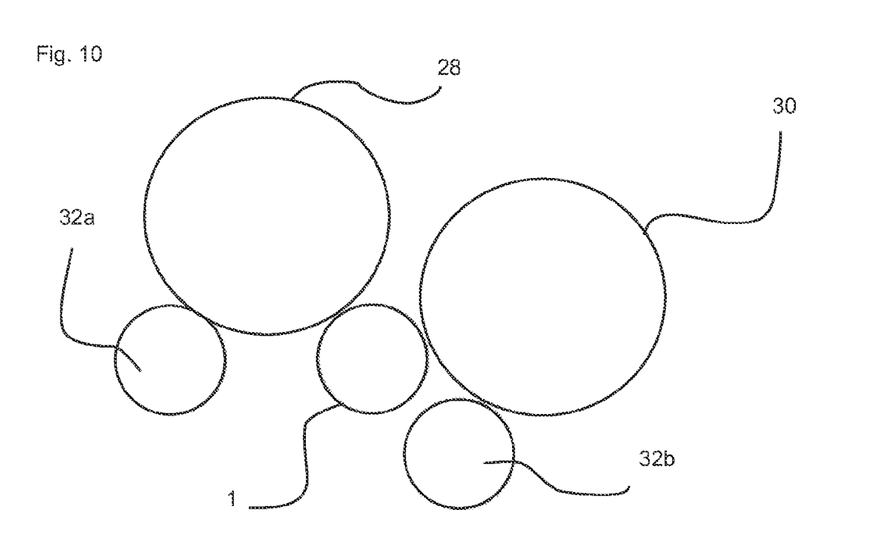
FIG. 10 shows an embodiment of a transport route in which transport of containers takes place according present inventive concepts.

FIG. 10 shows an example of a transport route. The containers, in particular the preforms 10, are guided for example via a transport device 32a to a treatment device such as e.g. a heating device 28. The preforms 10 are heated by the heating device 28. The heated preforms 10 are for example transportable by means of a transport device, in particular a transport device 1 according to inventive concepts, from the heating device 28 to a further treatment device e.g. in particular a rotating blow wheel 30. The blow wheel 30 can also be a transport device according to inventive concepts. On the blow wheel 30 is arranged a multiplicity of blowing stations 27. After forming of the preforms 20 into containers in the blowing station 30, the containers can be guided for example by means of a further transport device 32b to a further treatment and/or transport device. It is conceivable here that as well as or instead of the transport device marked 1, the further transport devices 22a, 22b and/or individual ones of these transport devices and/or all or individual ones of the treatment devices 28, 30 can be formed as transport devices 1 in the sense of the present invention. Also a use is conceivable on all transport devices treating the preforms or containers, in particular with heat treatment, such as sterilisation devices or rotating filler devices. The use of the present invention is particularly suitable in a filling device for filling bags and/or very thin-walled plastic bottles which can easily deform under centrifugal force. The term "bags" here refers to all holder containers which are not produced by blowing. Particularly, for example, bags have material layers connected together and overlapping at least in sections. Bags can for example be made amongst others on a basis of paper or plastic. It is however also conceivable that bags can consist of other materials or material mixtures.

In FIGS. 6 to 11, the receiver device 8 according to inventive concepts and the transport unit 4 are the blow mould 24 and blowing station 27 respectively.

Figure 11:
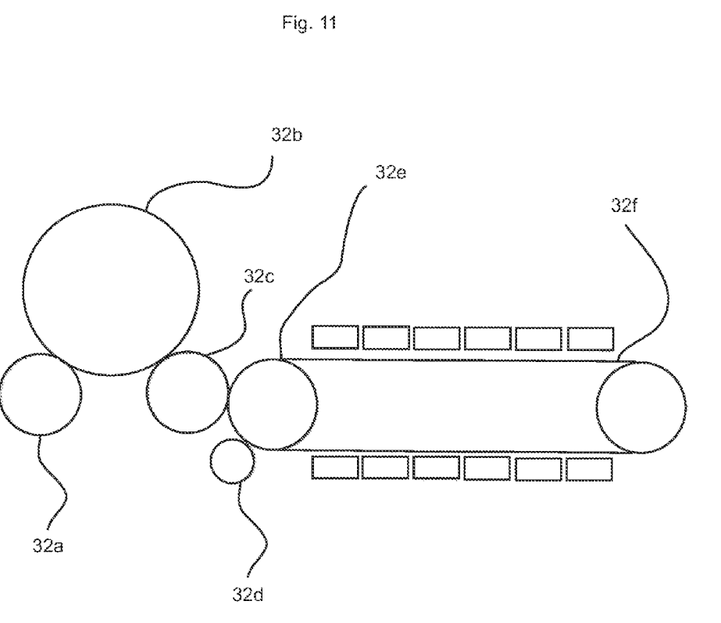
FIG. 11 shows an embodiment of a transport route in which transport of containers takes place according present inventive concepts.

It would also be conceivable not to align the entire blowing station 27 at an angle to the horizontal but merely the blow mould 24 itself. A stretch rod 26 arranged directly on the blowing station could in this case be omitted, in that either no stretch rod 26 is used for blow moulding or the preform 10 is stretched, viewed in the transport direction, not on the blow wheel 30 but before the blow wheel 30 in a separate module or for example in the heating device 28.

FIG. 11 shows a further example of a transport route of the preform 10 or container. It is here conceivable that individual or all rotational and/or sectional linear transport and/or treatment devices 32a to 32f shown are formed as transport devices 1 in the sense of the present invention.

Figure 12:
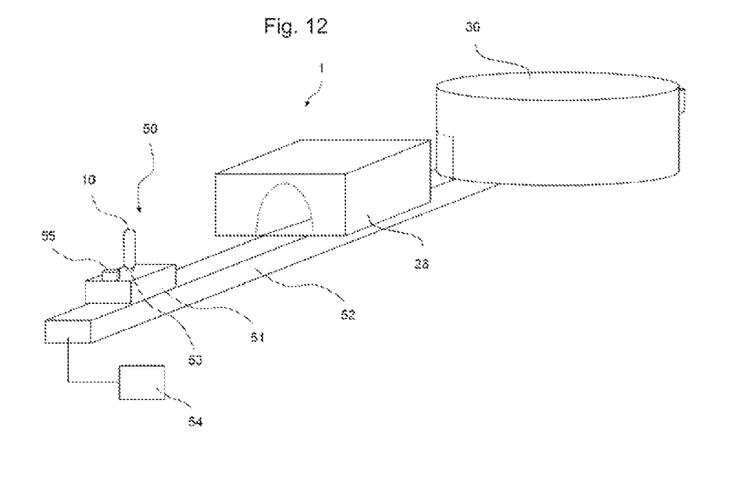
FIG. 12 shows an embodiment of a shuttle system for transporting containers according present inventive concepts.

FIG. 12 shows a further example of a device according to inventive concepts as a shuttle system. Numeral 50 relates to the shuttle itself on which is mounted a controlled swivelable mandrel 53. On the mandrel is placed a preform 10. The shuttle 50 comprises, as well as mandrel 53, a magnetically operated rotor 51 which cooperates with the guide track 52. Together the guide track 52 and rotor 51 form a linear drive. The mandrel 53 can be swivelled either via control curves not shown or electrically in at least one, for example, two axes by means of at least one drive 55 arranged on the shuttle 50. The drive 55 is, for example, a servo motor. The control signals for swivelling are received by the mandrel 53 from a control unit 54 connected to the guide track of the stator 52. The speed of the shuttle 50 can also be prespecified variably by a control unit 54. Depending on the track curvature, thus the force acting on the preform 10 or its direction in relation to the preform 10 can be set optionally by specifying the track speed and/or the tilt angle of the mandrel. Also shown diagrammatically are a heating device 28 and a rotating blow wheel 30 through which passes the shuttle 50.

Figure 13:
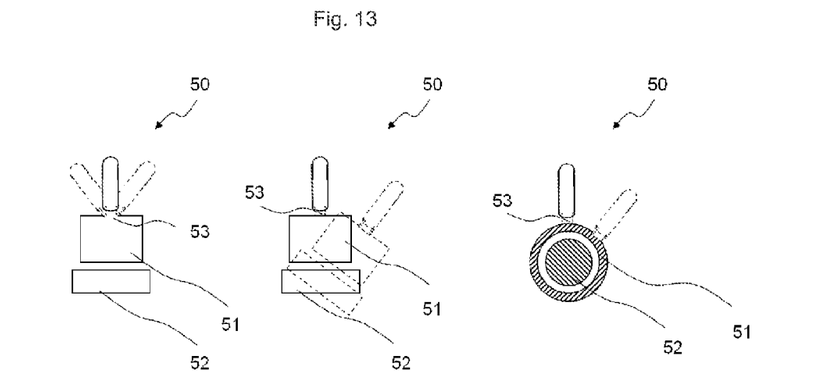
FIG. 13 shows various embodiments of alignment arrangements for aligning the shuttle of FIG. 12.

As seen in FIG. 13, alternatively to the controlled alignment of mandrel 53 an alignment or tilt of the entire guide track 52 is conceivable. The inclined alignments are shown in each case by dotted lines. These could also be mounted elastically and aligned actively by a further drive not shown, in order to influence the centrifugal forces at different speeds of the shuttle 50. Furthermore the rotor 51 and the guide track 52 can be formed as tubular linear motors. In this way different inclines can be achieved very simply in that the entire shuttle 50 rotates about the round stator 52.

The guide track 52 along which pass the containers or preforms 10 is in particular, at least in sections, formed meandering whereby in different sections of the pitch circle or guide track 52, different treatments can take place such as preferential heating, preheating in a preheating oven, end temperature profiling in either a rotating or a linear microwave or infrared oven, a compensation phase for even temperature distribution in the wall thickness, preblowing, final blowing, stretching or sterilisation. In particular the incline angle of the containers or preforms for various treatments can be dependent of to the treatment. For sterilisation it has proved particularly advantageous if the sterilisation agent, for example gaseous $H_2O_2$, is introduced obliquely or eccentrically in relation to the preform longitudinal axis L. The sterilisation effect could also be measured and the incline angle regulated accordingly.

The applicant reserves the right to claim all features disclosed in the application documents as essential to inventive concepts where novel individually or in combination in relation to the prior art.

We claim:

1. A transport device for transporting containers, the transport device comprising:
   at least one transport unit movable along a curved track for transporting at least one container in response to a drive unit, the transport unit having a transport component mobile on the track; and,
   a receiver device for holding at least one container, wherein the receiver device is constructed and arranged to be aligned in response and in relation to at least one movement force imparted upon the receiver device or the container as a result of movement of the transport unit, wherein the at least one movement force includes at least one of a centrifugal force in response to a transport movement on a curved track or an acceleration force in response to a change in transport speed, wherein the at least one container has an inertia or weight, and wherein the centrifugal force at least partly comprises the inertia or weight of the container or is a result of a vectorial sum of the centrifugal and acceleration forces.

2. A transport device according to claim 1, wherein the receiver device is constructed and arranged to align the body of the container while the container is deformable in a direction transverse to its longitudinal axis.

3. The transport device according to claim 1, wherein the receiver device can be swivelled about at least one first axis.

4. The transport device according to claim 3, wherein the receiver device can be swivelled about a second axis.

5. The transport device according to claim 1, wherein the receiving unit is constructed and arranged so that the alignment of the receiving unit substantially deflects the at least one movement force to a movement force directed along the longitudinal axis of the container.

6. A transport device according to claim 1, wherein the receiver device is constructed and arranged to automatically align the container.

7. A transport device according to claim 1, wherein the receiver device is constructed and arranged to be aligned by an alignment device.

8. A transport device according to claim 7, wherein the alignment device comprises at least one servo motor which is in contact with both the transport component and the receiver device.

9. A transport device according to claim 7, wherein the alignment device comprises sections that represent a control curve.

10. A transport device according to claim 1, wherein the receiver device is constructed and arranged to be aligned automatically in sections and guided in sections.

11. A transport device according to claim 1, wherein the transport device is a transport star.

12. A transport device according to claim 1, wherein the transport device is a blow wheel.

13. A transport device according to claim 1, wherein the transport device is a shuttle system.

14. A method for transporting containers comprising:
    moving a transport unit for transporting at least one container along at least one curved track, wherein the transport unit moves in response to a drive unit, and wherein the transport unit has a transport component mobile on the track; and,
    holding the at least one container in a receiving unit; and,
    aligning the receiving unit in response at least one movement force imparted on the container or receiving unit, wherein the at least one movement force imparted on the container or receiving unit results from movement of the transport unit, wherein the at least one movement force includes at least one of a centrifugal force in response to a transport movement on the curved track or an acceleration force in response to a change in transport speed, wherein the at least one container has an inertia or weight, and wherein the centrifugal force at least partly comprises the inertia or weight of the container or is a result of a vectorial sum of the centrifugal and acceleration forces.

15. A transport device for transporting containers, the transport device comprising:
    at least one transport unit movable along a curved track for transporting at least one container in response to a drive unit, the transport unit having a transport component mobile on the track; and
    a receiver device for holding at least one container, wherein the receiver device is constructed and arranged to be aligned in response and in relation to at least one movement force imparted upon the receiver device or the container as a result of movement of the transport unit, wherein the force includes at least one of a centrifugal force in response to a transport movement on a curved track or an acceleration force in response to a change in transport speed, wherein the receiver device can be swivelled about at least one first axis, and wherein the receiver device can be swivelled about a second axis.

* * * * *